(12) United States Patent
David

(10) Patent No.: US 8,527,278 B2
(45) Date of Patent: Sep. 3, 2013

(54) INTELLIGENT HOME AUTOMATION

(76) Inventor: Abraham Ben David, Beersheva (IL)

( * ) Notice: Subject to any disclaimer, the term of this patent is extended or adjusted under 35 U.S.C. 154(b) by 923 days.

(21) Appl. No.: 12/493,590

(22) Filed: Jun. 29, 2009

(65) Prior Publication Data

US 2010/0332235 A1    Dec. 30, 2010

(51) Int. Cl.
*G10L 15/00* (2006.01)
(52) U.S. Cl.
USPC ............................. 704/275; 704/251; 340/5.2
(58) Field of Classification Search
USPC .................................. 704/251, 275; 340/5.2
See application file for complete search history.

(56) References Cited

U.S. PATENT DOCUMENTS

| | | | |
|---|---|---|---|
| 5,052,395 A | | 10/1991 | Burton et al. |
| 6,400,996 B1 * | | 6/2002 | Hoffberg et al. ................ 700/83 |
| 2006/0047656 A1 | | 3/2006 | Dehlinger et al. |
| 2006/0142880 A1 | | 6/2006 | Deen et al. |
| 2006/0218244 A1 * | | 9/2006 | Rasmussen et al. .......... 709/218 |
| 2007/0254604 A1 | | 11/2007 | Kim |
| 2007/0290793 A1 * | | 12/2007 | Tran ............................. 340/5.64 |
| 2008/0040675 A1 | | 2/2008 | Canfield et al. |
| 2009/0043580 A1 * | | 2/2009 | Mozer et al. .................. 704/251 |
| 2009/0106019 A1 | | 4/2009 | Chen et al. |
| 2009/0112828 A1 | | 4/2009 | Rozenblatt |
| 2009/0122198 A1 | | 5/2009 | Thorn |
| 2010/0169098 A1 * | | 7/2010 | Patch ............................ 704/275 |

OTHER PUBLICATIONS

Abraham S. Ben David :"A parser analyzer of empirical design for question-answering, National Computer Conference" 1977, pp. 669-678.
Abraham S. Ben David:"A memory structure of empirical design-answering", Webster Research Center, 1989, pp. 792-799.
Richard A Quinnell :"Networking moves to home automation" Technical Editor—EDN, Jul. 5, 2007.

* cited by examiner

*Primary Examiner* — Daniel D Abebe
(74) *Attorney, Agent, or Firm* — Mark M. Friedman

(57) ABSTRACT

An intelligent home automation system answers questions of a user speaking "natural language" located in a home. The system is connected to, and may carry out the user's commands to control, any circuit, object, or system in the home. The system can answer questions by accessing the Internet. Using a transducer that "hears" human pulses, the system may be able to identify, announce and keep track of anyone entering or staying in the home or participating in a conversation, including announcing their identity in advance. The system may interrupt a conversation to implement specific commands and resume the conversation after implementation. The system may have extensible memory structures for term, phrase, relation and knowledge, question answering routines and a parser analyzer that uses transformational grammar and a modified three hypothesis analysis. The parser analyzer can be dormant unless spoken to. The system has emergency modes for prioritization of commands.

21 Claims, 10 Drawing Sheets

INTELLIGENT HOME AUTOMATION

COMPUTER PROGRAM LISTING APPENDIX

A computer program listing is included as an appendix to this disclosure in the form of a text file created on Jun. 29, 2009 by MS-Windows XP in ASCII text format as a ".txt" file and has 28,708 characters (no spaces). This Computer Program Listing Appendix is incorporated herein by reference in its entirety.

BACKGROUND OF THE INVENTION

The present invention generally relates to apparatus and methods for intelligent automation of the home environment and, more particularly, to such apparatus and methods that allow a homeowner to speak in natural language and effectuate automatic control of appliances and systems in the home.

A recent article entitled "Networking Moves to Home Automation" by Richard A. Quinelli, who is the contributing technical editor of the EE Times and a recognized expert in the design of products in the electrical engineering area, made important observations concerning the state of the market for home automation. The article stated: "[t]he dream of an intelligent home that automatically controls the living environment and responds to individual preferences has been around since the advent of the microcontroller first suggested the possibility. High cost, reliability issues, limited capability, and a lack of standards have imposed major constraints on the market, however, keeping home automation more in the realm of imagination than practice."

As can be seen, there is a need to have an intelligent home automation system that is more natural and easier to use and more capable than known home automation systems. Ideally, such a system should also comfortably converse with the user and respond effectively to the commands of the user to control the home environment. The system should also ideally work without the attention of the user, be usable where and how the user wishes without significant restrictions. From a technical point, moreover, the system should preferably have long operating life and be interoperable with other technology components yet be affordable.

SUMMARY OF THE PRESENT INVENTION

In one aspect of the present invention, there is presented a method of intelligent home automation that controls objects in the home, the method comprising a home automation system carrying on a conversation in a natural language with a home user concerning anyone present in the home and/or concerning any objects in the home that need to be controlled by the home user, the home automation system including software and including hardware either connected to the objects or to home systems controlling the objects, the home automation system carrying on the conversation such that (i) a home user's voice inputs natural language into a voice recognition system; (ii) the voice recognition system outputs text; (iii) the home automation system converts the text into a natural language; (iv) the home automation system parses a syntax of the text; (v) the home automation system determines if the text is a query, a command or a declaration, and if the text is a query not in complete interrogatory form, reconfigures the text into a declarative form having a missing ending, the ending representing a who, what, where when answer, and compares the text in the declarative form to data stored in declarative form that is located in a memory structure containing the who, what, where, when answer and if the query is in complete interrogatory form reconfigures the text into a declaration form followed by a question mark and then compares the text of the complete query in declarative form to data stored in declarative form located in the memory structure, (vi) the home automation system generates a response in natural language form to the query, the response being passed to a speech automation system that generates speech audible to a home user, (vii) if the text is a command, the home automation system determines if the command is complete, identifies a home object that the command is directed to and carries out the command on the home object, (viii) if the text is a declaration, the home automation system stores the declaration in the memory structure; and (vii) the home automation system responds to interruptions of the conversation and resumes the conversation without losing track of the conversation, the interruptions including home user commands, entry of new people into the home and emergencies.

In another aspect of the invention, there is presented a system of intelligent home automation, comprising a parser analyzer; memory structures; a question answering routine capable of generating natural language responses to natural language queries, storing declarative information from declarations of a user into the memory structures and responding to commands to control objects by searching for the objects in the memory structures and switching home circuits on or off connected to the objects; a transducer set to receive a sound wave input derived from a pulse of a person, the person located in the home or near the home; software capable of identifying the person based on a signal from the transducer; a speaker for announcing an identity of the visitor in natural language to a home user; and hardware connecting the software to objects and/or systems in the home that are operable automatically.

In a further aspect of the present invention, there is presented a system of intelligent home automation, comprising a parser analyzer that considers three hypotheses as to what a speaker means but can short circuit consideration of the hypotheses if it detects a strong imperative structure; memory structures including structures concerning term, phrase, relation and including knowledge structures, a question answering routine capable of accessing memory structures to store declarations, responding to commands by controlling home circuits and generating natural language responses to natural language queries by converting queries into declarations in conjunction with the parser analyzer and searching the knowledge structures for similar declarations that end with an answer or represent an answer, the question answering routine also capable of accessing data from global telecommunications system to respond to queries from a home user and storing such data in the knowledge structures for use in natural language responses; software capable of identification of a visitor to the home based on a signal from the visitor; a speaker for announcing the identity of the visitors in natural language to a home user, and hardware connected to home circuits that control objects.

These and other features, aspects and advantages of the present invention will become better understood with reference to the following drawings, descriptions and claims.

DETAILED DESCRIPTION OF THE INVENTION

Figure 1:
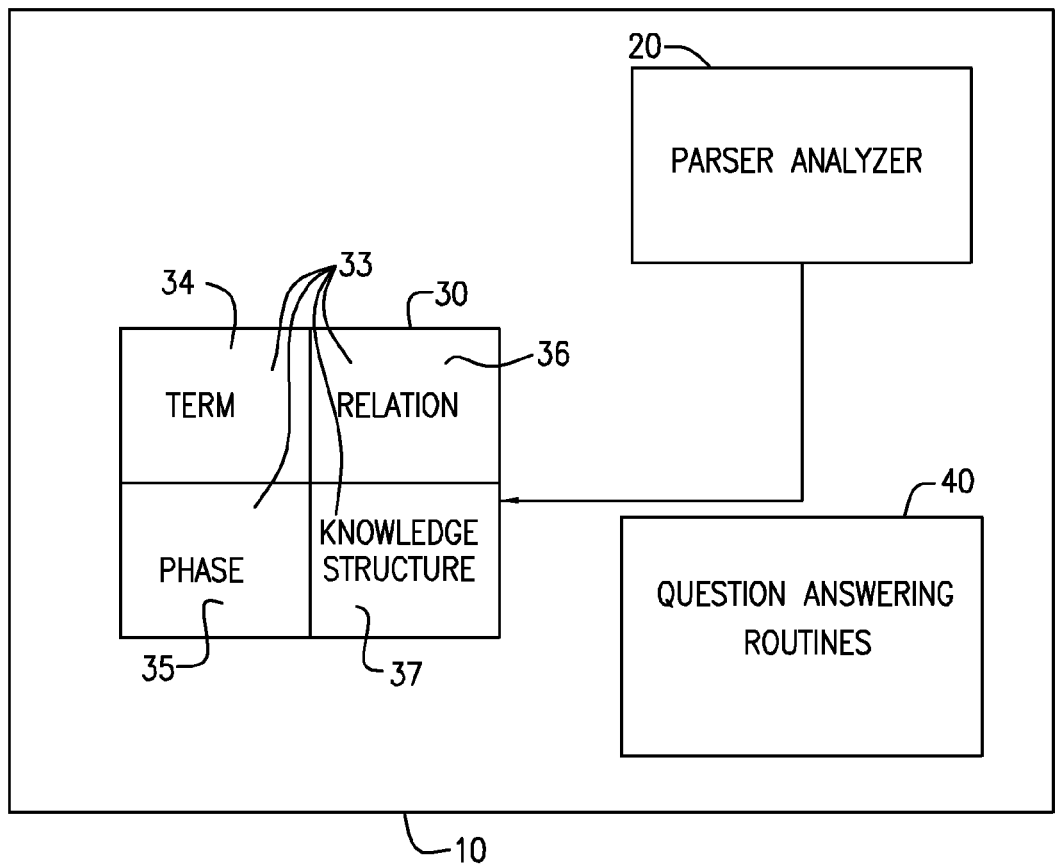
FIG. 1 is a schematic showing the basic elements of a system in accordance with the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an intelligent home automation system and method that may function as a servant that answers questions posed by a user speaking "natural language" located in a home. The system may be able to carry out the user's commands to control any circuit, object, appliance or system in the home, or in a specific part of the home. For example, the system may turn on or off the lights in a particular room, may open or close a particular window or door in a particular room and may turn on or off a particular appliance in a particular room. The present invention may also provide that the system includes hardware and software enabling the system to answer questions by accessing the Internet. Using a transducer that "hears" human pulses, the system may be able to identify, announce and keep track of anyone entering the home, remaining in the home or participating in a particular conversation in the home, including announcing their identity in advance of the entry. The system may also be able to carry on a natural language conversation with the user and may be capable of interrupting the conversation for the implementation of specific commands and still be able to resume the conversation after carrying out the commands. The system may be connected to all appliances and other parts of the home environment that the user wishes to be controllable. The system may include memory structures, a parser analyzer that may fully implement the transformational grammar, such as the transformational grammar defined by linguist Noam Chomsky, and question and answer routines. The memory structures, which may contain structures relating to term, phrase, relation and knowledge, may be fully extensible and may supply the parser-analyzer with information concerning the input to be analyzed.

In contrast to the prior art, in which home automation systems have a limited vocabulary inputted into its memory that is used to merely identify objects to be controlled, the system of the present invention may be able to carry on a conversation and respond to natural language and implement commands relating to control of any home system to which it is connected. In contrast to the prior art, in which home automation systems require formal and complicated interfacing methods, the system of the present invention may employ a simple interface method involving just talking to the system naturally. In further contrast to the prior art, in which home automation systems have simple structures, the system of the present invention may employ a home automation structure that includes a parser-analyzer, memory structures and question-answering routines. In further contrast to the prior art, in which individuals entering the home have to identify themselves to the system, the method and system of the present invention may employ a transducer to detect ultrasound signals of a person's pulse and thereby identify, announce and/or keep track of anyone who enters the home. In still further contrast to the prior art, in which home automation systems are limited, the method and home automation system of the present invention can answer questions posed to it by accessing the Internet automatically to retrieve information and incorporate this information into its responses during a conversation. In contrast to the prior art home automation systems which cannot carry on a conversation about any topic, the home automation system of the present invention may be capable of carrying on a conversation on any topic at the pace of a normal human conversation. In further contrast to the prior art, in which the home automation systems are more limited, the method and system of the present invention may be able to carry on a natural language conversation, interrupt it for an emergency, respond to the emergency request for information or command, and then resume the conversation without losing track of where it was in the conversation. In still further contrast to the prior art, in which the memories used therein are fixed, the memory structures and structures (term, phrase, relation, knowledge) used in the method and system of the present invention have extensible memory. In still further contrast to the prior art, in which the home automation system are not turned on or off merely from conversational prompts by a speaker/user, the method and system of the present invention may use a system that offers privacy and does not listen to the speaker's conversations unless prompted to do so. In still further contrast to the prior art, in which home automation systems cannot prioritize requests or commands made during a conversation, the method of the present invention may employ a home automation system that can prioritize and decide which requests or commands need to be urgently implemented and which may be able to wait. In contrast to the prior art, in which home automation systems are stagnant, the home automation system and method of the present invention may improve its ability to analyze the declarations, questions and commands of the home user by storing and accessing information from the memory structures, for example concerning the use of particular words.

As seen from FIG. 1, a system 10 of intelligent home automation may comprise a parser analyzer 20, memory structures 30 and question answering routines 40. System 10 may be capable of interacting with a user 50 in a home 60 so as to generate natural language responses to natural language queries of the user 50.

When a speaker in the home speaks, a voice recognition system may convert the speech into text that may comprise a series of sound segments. Parser analyzer 20 may accept any and all text comprising sound segment inputs that it receives from the voice recognition system and a pre-processor of parser analyzer 20 then may convert the sound segments into a natural language, parsing a syntax of the text, determining if the text is a query, a command or a declaration. Any suitable speech processing system, for example, speech processing software made by a company called Nuance headquartered in Burlington, Mass., may be used for converting the sound segments into a natural language such as English.

Parser analyzer 20 may make three distinct hypotheses with regard to what the input is and may compare each hypothesis to the actual input until it has successfully analyzed what has been presented to it. This process may be known as analysis by generation. This means analyzing something not by taking it apart but by generating what I think it is and then comparing my hypothesis to the actual input. The parser analyzer may thereby generate a formal structure. An example of a formal structure is PHRASE (1, y), which may mean the pointer "1" of a particular phrase, "y", which points to where this phrase appears as a subject in the sentence. PHRASE (2, y) may mean the pointer "2" of a particular phrase, "y", which points to where this phrase appears as an object in the sentence. PHRASE (2, y) may mean the pointer "2" of a particular phrase, "y", which points to where this phrase appears as an object in the sentence. PHRASE (1, y+1) may mean the pointer "1" of a second particular phrase, "y+1", which points to where this phrase appears as a subject in the sentence. Formal structure may also exist for RELATION, which may be written "RLATION (1,z)", "RLATION (2, Z)", "RLATION (3, z)", "RLATION (4,z)", etc.

The formal structure as well as the earlier versions of the structure considered as hypotheses by the parser analyzer 20 are stored in a temporary memory forming part of the parser analyzer 20.

System 10 may transfer a formal analyzed structure of, for example, a sentence uttered by the speaker/user, to the permanent memory structures 30. In case contradictions have to be resolved, system 10 has a protocol for resolving them. An example of a contradiction is if we know that the house is brown and a subsequent user states that the house is white. System 10 may not always resolve such a conflict immediately. Such a fact can be saved as represented. For example, system 10 may store the fact as being said by "x" (whoever that might be) at time "y" (all of this information is captured in any case in the knowledge structure). If the question is later asked "What color is the house?" system 10 may first try to understand which "house" is being discussed. If it determines that both statements were made at similar times about the same house if will respond "According to "a" the house is brown and according to "b" the house is white." If any sort of question such as "who is right" is asked, the system will respond either that the administrator says the house is so-and-so or that the administrator is not available to resolve the conflict. That is one example of conflict resolution where the administrator is always believed to be the absolute truth. Another example of contradictions could be where in the above case, if both statements were made at very different times, system 10 may state that at times "y" "person so and so" stated that the house was white and that at time "z" someone else stated that the house was brown.

In order to successfully carry on a conversation with a user, system 10 may be able to respond to the user at a pace which may be similar to the pace of human conversation. The computer programming language "FORTRAN", extremely fast, is not designed for language processing. Counterintuitively, although software 80 of system 10 of the present invention may employ a variety of computer programming languages, it has been found that the computer language FORTRAN is particularly suitable for the application of the present invention and all subroutines required for language and character processing and handling have been developed accordingly.

If the text of the user's sound segments converted to natural language by parser analyzer 20 is determined by parser analyzer 20 to be a command or a declaration, then question answering routines 40 are not called upon to act. However, if the text of the user's sound segments converted to natural language is determined by parser analyzer 20 to be a query, question answering routines 40 may reconfigure the text into a declarative form.

System 10 distinguishes between two types of queries. As to queries in which the text of the query is a "who", "what", "where", or "when" question (i.e. "Where is the green cat?"), system 10 defines such queries as "not in complete interrogatory form" and as to such queries question answering routines 40 may reconfigure the text into a declarative form having a missing ending, the ending representing a who, what, where when answer, and may compare the text in the declarative form to data stored in declarative form that is located in a memory structure containing the "who", "what", "where", "when" answer. On the other hand, if the query is in a yes or no format (i.e. "Is the cat green?"), which system 10 defines as "in complete interrogatory form", question answering routines 40 may convert the text of such a query into a declarative form that is a complete declaration followed by a question mark, for example "The cat is green?". Question answering routines 40 may then search memory structures 30 focusing on declarations in the memory structures 30 that match the declarative form of the query and that therefore may represent an answer to the query.

Question answering routines 40 may thereby generate a response in natural language form to the query in either form it may be in. The response may then be passed, for example by question answering routine 40, to a speech automation system 99 that may generate speech comprising the response that may be audible to a home user.

The following explains the operation of system 10 in question answering mode. Such a mode can occur at any point by simply directing a query to system 10, for example, "Where is the green cat?" It should be noted that if system 10 is in declarative mode, for example, a story is being told that system 10 has been asked to input into its memory, and in that context the statement occurred "John asked Betty 'where is the green cat?'", system 10 would not answer this question, rather it would store the analyzed question (including entering it into declarative mode with a question mark).

Let us assume that the question is "Where is the green cat?". After Parser analyzer 20 has completely processed this question, question answering routines 40 converts the question into declarative mode, i.e. "the green cat is _____ (where)?". The form of the blank is important (in this specific case, it may be called a "where" blank). In contrast, the question could have been "What is the green cat eating?" In such a case, the declarative form would be—"the green cat is eating _____ (what)?"

Question answer routines 40 may first conduct a more intensive search in memory structures 30, focusing on "the green cat". In the regular memory structure operation, it would already be determined if the "term" cat existed or not. If it did not exist previous to this question because either:

1) the "term" did exist in the dictionary but there had not been any occurrence of its use as a noun—the value of term (4,x) (note—"x" indicates the position that the specific term has in the overall dictionary) is 0, this indicates that this term did not appear as a noun. For the question under consideration, that would seem to be the principle concern.

2) the "term" did not exist in the dictionary prior to its occurrence in this question.

then, the system would respond that "it is not aware of any green cat".

If on the other hand the term did exist previously and term ($4$,x) was not equal to zero, i.e. was used as a noun, (the number "4" means "noun"), the search would begin in the phrase array. The term "green" has similar considerations as for the term "cat". Does it exist in term, did it occur previously, was it used as a modifier (term ($5$,x)). If either of the answers is that it does not exist or that it was not used previously, there is probably no information on "the green cat". However, if there was information about a "turquoise cat", that might also be interesting. For system 10 to be able to deal with such a fact, there would have had to have been some sort of statement like "Turquoise is like green." If no such statement had occurred than system 10 could not proceed. System 10 would know whether such information existed, if the term green exists from entry term ($4$,x) of green. If this pointer is 0, there is no information to assist as there is no additional information about the nature of green.

On the other hand, if term ($4$,x) of cat has values and term ($5$,x) of green has values, the search can begin. The phrase that is indicated by a crossing of term ($4$,x) of cat with term ($5$,x) of green, will yield some form of "green cat". The phrase entry itself would have to be examined for more details.

The determination that the phrase only concerned the "green cat" would be from phrase ($6$,x)—structure of the phrase. This indicates the order and the number of words that appear in the phrase. The desire would be for only green and cat to be there. The best values for phrase ($14$,x) would be:
Phrase($14$,x)=2 (non-human)
Phrase($14$,x)+1=2 ("the")
Phrase($14$,x)+2=11 (quantified and singular)

If these values are appropriate, then something is known about the green cat. Now the question for the system is—does the system know where the green cat is? The system 10 would check phrase ($7$,x)—"where—prepositional". If there was no value here, the system does not know where the green cat is. If there is a value then, is there only one value or are there several values? If it is only one value, that could be supplied as the answer. If there are many values, system 10 may respond with the first value and comment that there are other possible answers. First, there would have to be confirmation that the phrase array entry being considered actually refers to "the green cat".

Let us instead assume that the question is "Is the cat green?". After parser analyzer 20 has completely processed this question, question answering routines 40 may convert the question into declarative format with a question mark, i.e. "the cat is green?". Question answer routines 40 may first conduct a more intensive search in memory structures 30, focusing on a declaration in the form of "the cat is green". The presence of this declaration in the memory structures 30 may represent the "Yes" answer to the query. If the declaration "The cat is green?" is not found in the memory structures 30, the answer may be "I don't know".

If the fact (that the cat is green) exists in memory structures 30 in a slightly different format, the decision may be harder. If, for example, the fact that exists is "the house cat is green.", system 10 would respond "the house cat is green". That response may or may not be what the user/questioner is looking for. If the user wants some more specific information, he would have to ask the question differently. For example, he may ask "are there any other cats?" Question answering routines 40 of system 10 would then check how much information exists for the TERM "cat"—TERM($4$,x), this pointer indicates where in the PHRASE file there are phrases with "cat" as the noun of the phrase. Question answering routines 40 of system 10 would also further check for basic concept phrases—"the cat", "the house cat", etc. Finding such basic phrases would enable question answering routines 40 to make an evaluation with regard to the extent of information about the particular subject.

PHRASE($1$,y) indicates where the particular phrase is used as a subject. Assuming a suitable phrase—"the cat" or "the house cat" or similar—those RLATIONs which have as a verb a form of "be" are most important (indicated by RLATION($1$,z)). What in particular is important is that the transformation, RLATION($4$,z), be "active generic", and the tense be present, RLATION($5$,z)—that is "is/are".

If there is a suitable PHRASE($1$,y) used as the subject in a suitable RLATION($1$,z), there is the statement in the memory "the cat is ". Now the further search is if there is any PHRASE ($2$,y), use of phrase as object, that indicates "green" in some form.

The question answering routines 40 may pass the answer to a speech generating system 99 for creating a response audible to the home user.

The search in the memory structures 30 may be performed based on the context of the conversation. That is, the salient part of the memory structures 30 that includes elements discussed earlier in the conversation may be the focus of the search. For example, if the conversation were about Joe and his cat previously, then the elements in the memory structures 30 relating to "Joe" and "Joe's cat" may be the target of the search.

The answer may be "No" to the query "Is the cat green" only if the search revealed information contradicting the cat being green, i.e. the cat is yellow.

If the text is determined by parser analyzer 20 to be a command, parser analyzer 20 may determine if the command is complete, may identify a home object that the command is directed to and may carry out the command on the home object.

If the text is determined by parser analyzer 20 to be a declaration based on its syntax, parser analyzer 20 may transfer the formal analyzed structure of the declaration to the memory structures 30 where system 10 may store the declaration.

In carrying on conversations between system 10 and a home user, the conversation content will be affected both by the personality of the user as well as by the "personality" of system 10. The "personality" of system 10 refers to the fact that software 80 may set up system 10 in a variety of ways affecting the degree to which question answering routines 40 of system 10, in conversing with a home user, provides information that is close to but not exactly the same as the precise question asked. For example, if the question was "Is the cat green?" and the question answering routines 40 have no entries in memory structures 30 for "The cat is green." but has a lot of other information about other colors of cats in the house, should system 10 offer such information. System 10, for example may have information that there is a hazel cat in the house and have other information that "hazel" is almost green. Just like humans may vary in how they converse in this regard, so may system 10. However, the "personality" of system 10 may be set by the user as to how the user desires system 10 to respond in the event no precise "yes" answer is available but close to precise information is available.

If user gets a "No" responsive to "Is the cast green", the user can say "Tell me what you know about cats" or "what color cats are there in the house?". The user, for example, can say to system 10 "If I ask you something on a subject and you don't have an exact answer, tell me everything you know". System, by default, may be set to "50" as the limit to how much information it provides on a subject. The user can also modify this setting. System 10 may thereby limit the total pieces of information it knows about a subject to meet the quantity limitation requirement.

System 10 may respond to interruptions of the conversation and resume the conversation without losing track of the conversation, the interruptions including home user commands, entry of new people into the home and emergencies.

System 10 may store declarative information from user's 50 declarations into the knowledge structures of the memory structures and may respond to commands of user 50 to control objects by searching for the objects in the memory structures 30. System 10 may be connected to any objects and/or systems in the home that are operable automatically. For example, software 80 may be connected to hardware 85 which may in turn be connected to objects and systems/circuits in the home that are controlled by system 10, for example through circuitry and other known means. For example, these objects may be appliances that are connected to home circuits that system 10 switches on or off in order to control the appliance. Battery-operated detector devices may be installed in each window. Such devices are known and fairly inexpensive. System 10 may have information as to which device (identifies by a serial number) may be installed in which window so system 10 can advise that a "middle bedroom window is ajar" rather than "window with device 8931 is ajar".

Figure 2A:
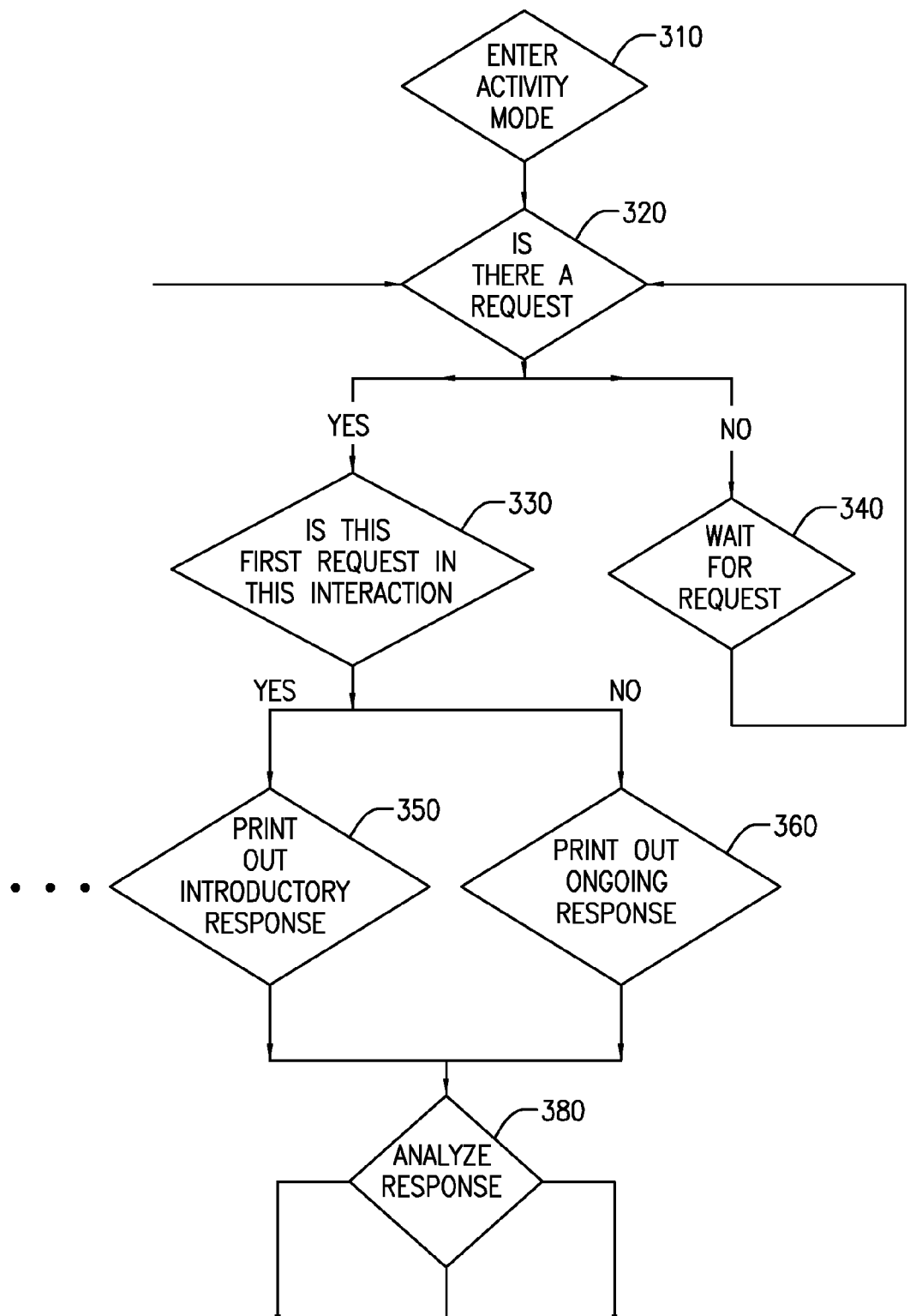
FIG. 2a is a flow chart showing a system in accordance with the present invention operating within an environment of a home and controlling objects in the home environment.
Figure 2B:
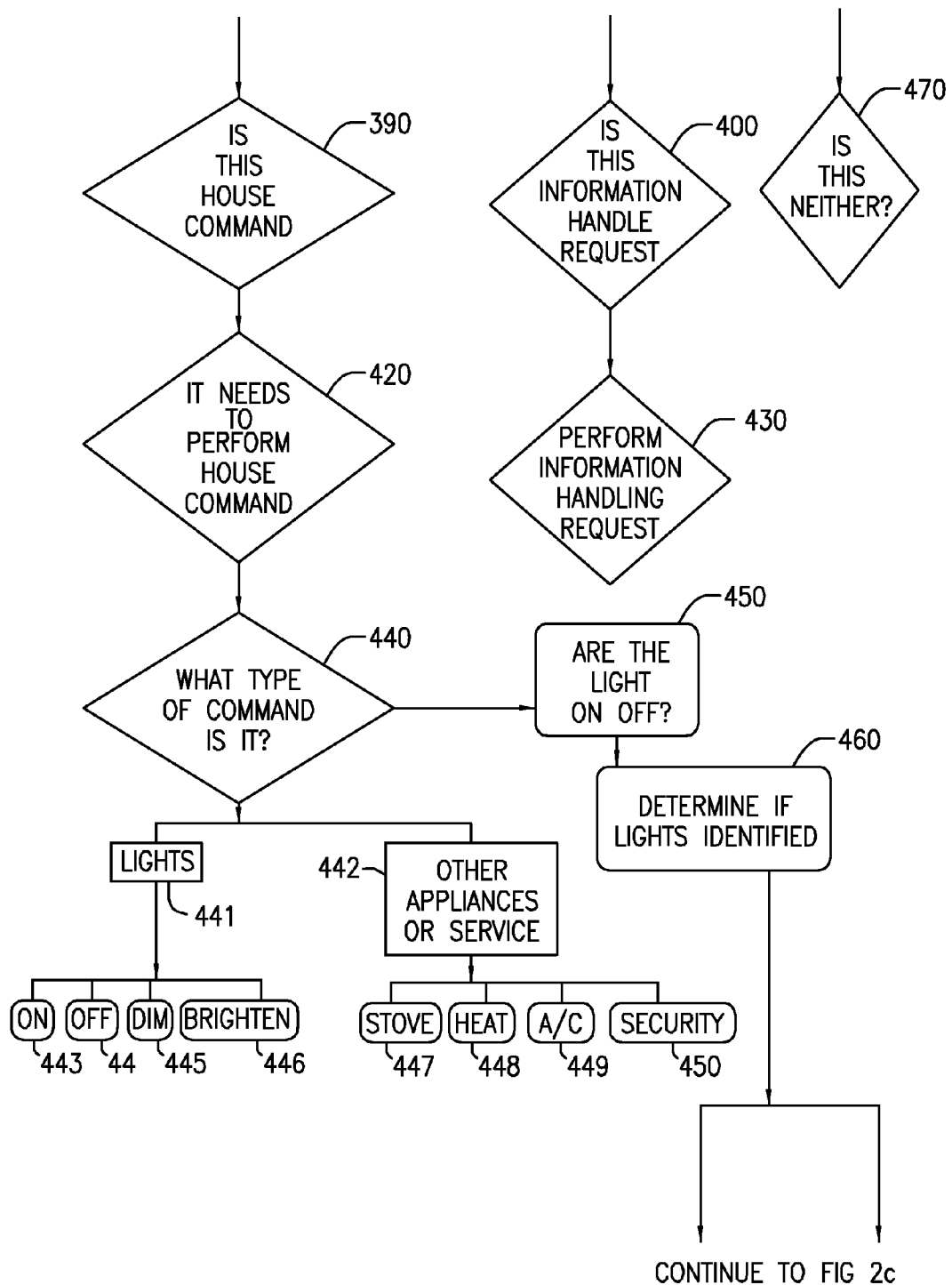
FIG. 2b is a flow chart continuation of the flow chart of FIG. 2a showing a system in accordance with the present invention operating within an environment of a home and controlling objects in the home environment.
Figure 2C:
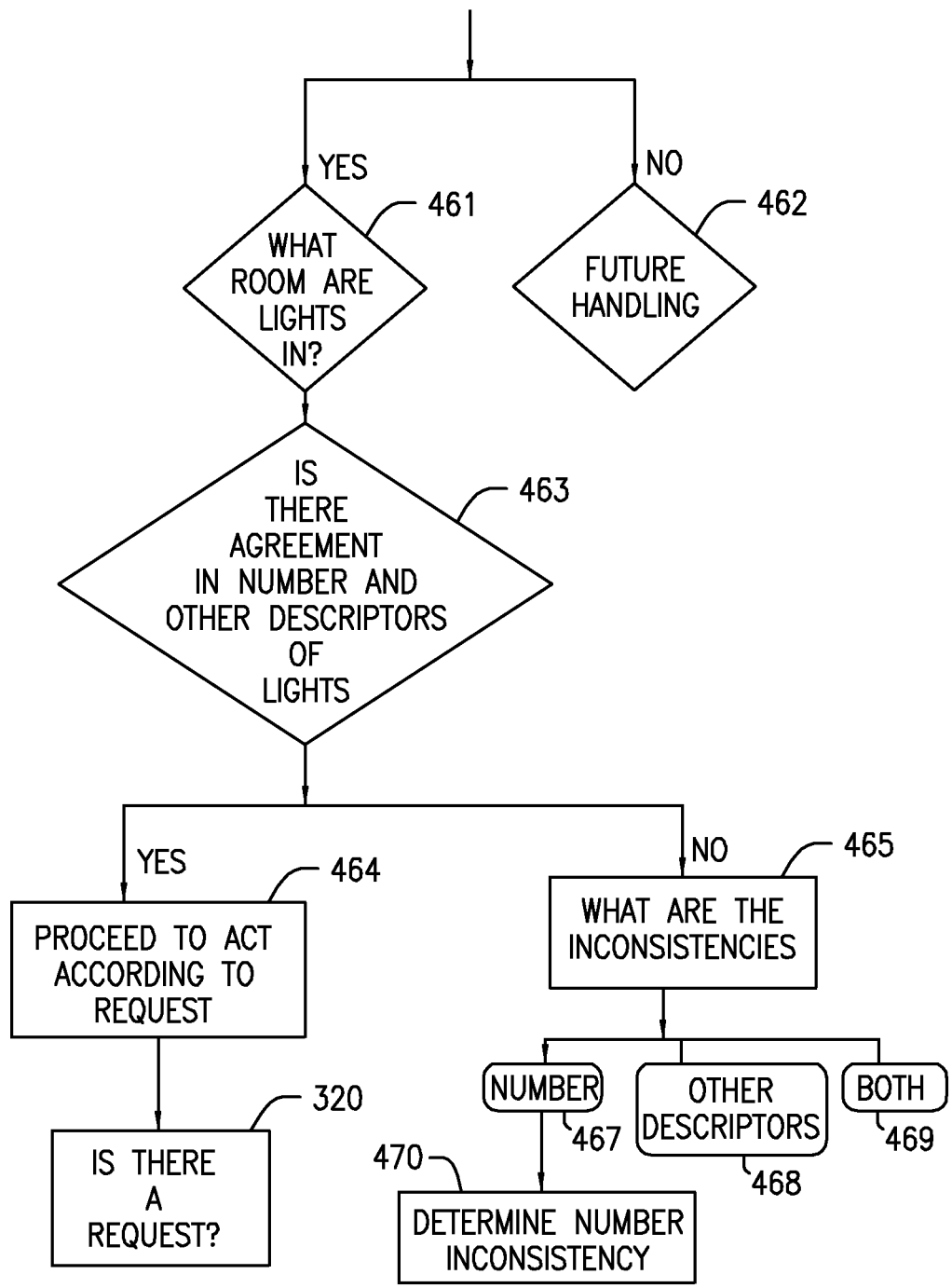
FIG. 2c is a flow chart continuation of the flow chart of FIG. 2b showing a system in accordance with the present invention operating within an environment of a home and controlling objects in the home environment.
Figure 3:
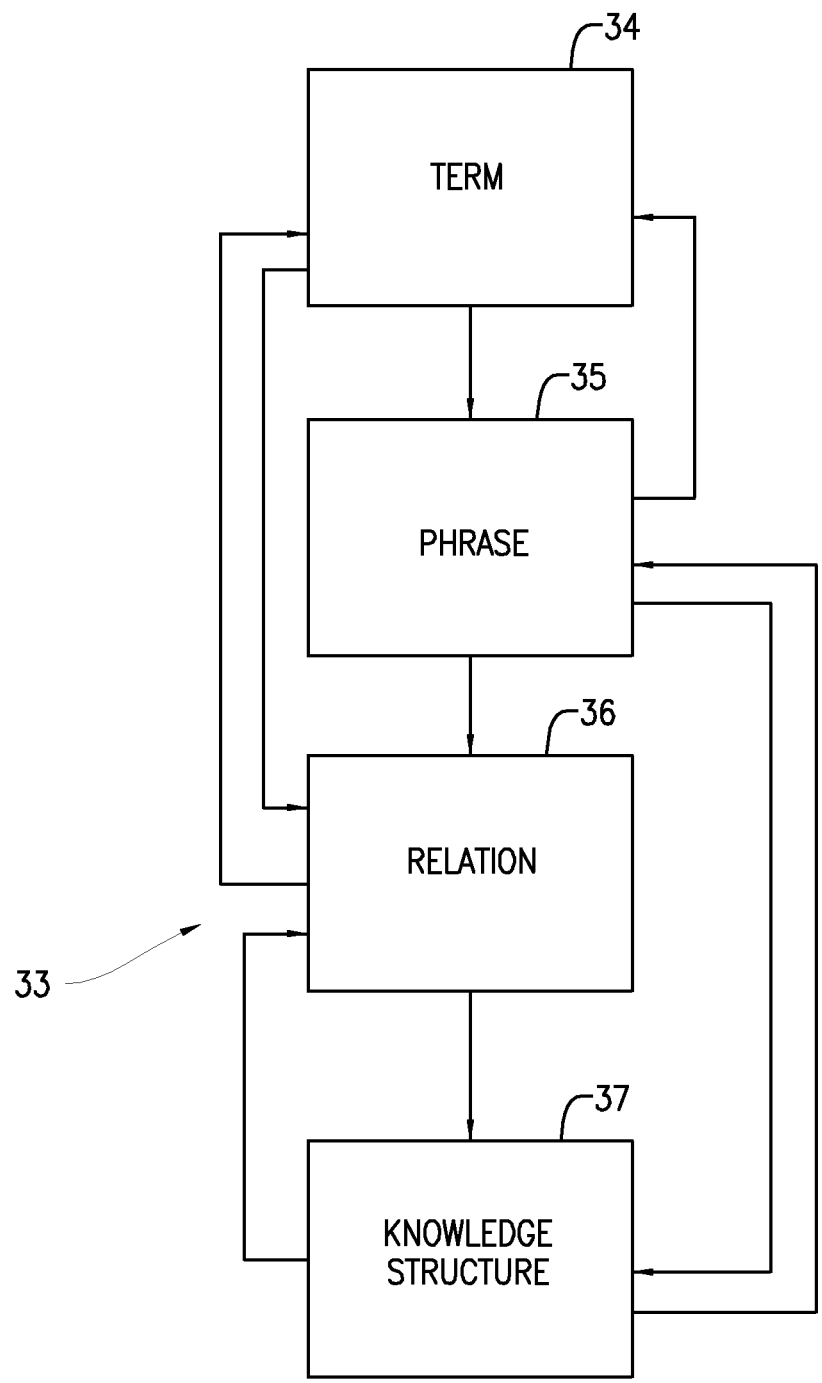
FIG. 3 is a schematic showing the overall interaction of memory structures in the system and method of the present invention.

FIG. 2a, FIG. 2b and FIG. 2c comprise a flow chart showing system 10 operating within an environment of a home and controlling objects or systems in the home environment. As seen from FIG. 2a, in accordance with box 310, system 10 enters activity mode. If there is no request, system 10 just waits, as seen from box 340. If there is a request, then if the request is the first request in this interaction between system 10 and the speaker, as shown in box 350, system 10 may introduce itself to the user by stating and/or printing out an introductory response, such "Quansy here, what can I do for you?". If this is not the first request in this interaction, system 10 prints out an acknowledgement of the response (this acknowledgement being standard or user defined).

In accordance with box 380 and box 370 of FIG. 2a and box 390 and 400 of FIG. 2b, system 10 may analyze the response of the user to determine if this request of the user is a house command, an information handling request or neither. As seen from FIG. 2b, if the request is neither a house command nor an information handling request, system 10, system 10 may explain that it does not understand the request and system 10 may explain the possible meanings. This can occur, if, for example, if system 10 is addressed by the user who commands system 10 to perform a task that system 10 cannot perform, such as "do the laundry". System 10 may then state: "I do not understand your request and therefore I am unable to perform it". System 10 may then repeat the introductory response, such as "Quansy here, what can I do for you?", if Quansy were the name that System 10 assumes in interacting with users. This type of request and occurrence may be tracked and if the loop repeats itself more than 3 times alternative action is required. The actual action will depend on who the user is at this point.

As seen from FIG. 2b, system 10 may perform the house command, see box 420, or the information handling request, see box 430, as the case may be.

If system 10 has determined that a house command has been received, the system 10 may need to determine at least three things relating to what type of command (see box 440 of FIG. 2b) prior to performing the command (see box 420 indicating that it is clear that system 10 needs to perform a house command): (i) which type of device has the control command been issued for (see boxes 441 through 450 of FIG. 2b), (ii) does the system know what the status of that device is (box 450 of FIG. 2b), and (iii) does the device exist in the system's memory to the degree necessary to perform the action required (box 460 of FIG. 2b).

As seen from box 460 of FIG. 2b, if the command relates to lights, system 10 may first determine if the lights that are the subject of the query are identified. If the answer to this question is "No", then system 10 awaits further information as indicated by "future handling" as shown in box 462. "Future handling" just means that if system 10 is unable to determine what to do at any point system 10 may inform the use either that it lacks the requisite information or that it does not understand what the user wants and may wait for whatever the user wishes to do next.

If the answer is "Yes", see box 461 in FIG. 2c, system 10 may determine what room the lights are in by accessing the knowledge structures 37. As seen from FIG. 2c box 463, system 10 may then determine if there is agreement in number and other descriptors of lights. For example, if the request was "turn the light on" or "turn the light off" and there is only one light, there is no problem, i.e. there is agreement in the number and description of the lights and system 10 proceeds to act according to the command (box 464 of FIG. 2c). Then, system 10 may return to "is there a request" mode as in box 320.

If, on the other hand, there are three lights in the room, there is an inconsistency that must be resolved, as shown in FIG. 2C (box 465). There may inconsistencies as to number (box 467) which may require determining the number inconsistency, i.e. how far off the inconsistency is (box 470). For example, if there are three lights and the user says "turn off the four lights" system 10 may assume that it should turn off the three lights and if that was incorrect the user will inform system 10 whereas if there are ten lights and the user says "turn off the four lights" system 10 may simply inform the user that there are ten lights and ask what it should do.

Alternatively, there may be inconsistency as to descriptor (box 468) or as to both (both 469). For example, if the request is "turn off the three side lights" but there are no side lights, then there is an inconsistency as to both number and descriptor, See box 469 in FIG. 2c. In this case, there has to be special preparation for such a case.

In general, whenever system 10 gets to a point where the answer is not obvious and it has conducted a significant amount of searching, for example of knowledge structures 37, system 10 may prefer to admit that it does not "see" an answer, for example, by saying "I am unable to help you with this request at this point" and return to "request information or a command" and it can deal with either a request for information of a command at any time.

Illustration of Approach Involving Special "Preparation" or Preprogramming

For example, If the command is given "turn off the three side lights" and there are only two lights and they are not identified as "side lights", the following will happen in accordance with one embodiment. System 10 may assume the user is referring to the present room, i.e. the room the user is located in. System 10 may then determine if there are lights in that room. If system 10 finds that there are not, system 10 may inform the user that the question is not understood since there are no lights. If, on the other hand system 10 finds that there are lights, system 10 determines if the lights are side lights. If yes, system 10 determines if there three such side lights and if so performs the requested action. If system 10 determines that there are no side lights, system 10 determines if there are three lights of any kind. For example, if there are three wall lights, system 10 asks the user "Do you mean the three wall lights?" If the user's answer is "No", system 10 may check if there is any other set of three lights, and if so, system 10 may also ask the user the same question about them whereas if the user's answer is "Yes" system 10 may perform the requested action on the three wall lights. If the user's answer was "No" and if after checking system 10 determines there are no other set of three lights, system 10 may say "I don't understand your request." and system 10 may add "the number of side lights you requested is inconsistent with the facts that I am aware of." If the answer to the earlier question "are there three lights" is determined to be no because for example there are two side lights, system 10 may perform the requested action for the two lights (and likewise if there were four lights) and may inform the user about the action taken for example by saying "I will light the two (or four) side lights."

For clarity, the same logic is recast in numerical format as follows:
1. assume present room under consideration.
2. determine if there are lights.
3. no—inform user that the question is not understood as there are no lights. go to beginning
4. yes—are there side lights?
5. yes—are there three side lights?
6. yes—perform action as per request.
7. no (from 4)—are there three lights?
8. yes (from 7)—fact—there are three wall lights.
9. "Do you mean the three wall lights?" (at this point, if the answer is no, the system will check if there is any other set of 3 lights, if so, it will also query about them.
10. yes—perform the action.
11. no—"I don't understand your request." go to beginning
12. no (from 7)—fact—there are two side lights.
13. perform action as per request (do this also for four lights), inform about the action taken—"I will light the two (or four) side lights." go to beginning.
14. "the number of side lights you requested is inconsistent with the facts that I am aware of." go to beginning.

As can be seen system 10 may exhibit "thought". First, system 10 may check if there are lights at all. If there are no lights, there is nothing for it to do. If there are lights, then system 10 may determine if what the user is interested in is available. If there are three lights, system 10 may assume the user intends those lights (note that system 10 will check if there is any other set of three lights in addition. It will query on those also if the first choice is not appropriate). However, once it has reached this point system 10 may not try to backtrack at this point and may inform the user that it does not understand the user's request. At this point system 10 understands that none of the simple possibilities answers the user's request. It is unable to go any further in this direction and rather than trying some complicated backtracking, it simply informs the user that it cannot help him at this point. It is contemplated that this way of handling the requests are one example of an approach that system 10 may be programmed to use and the user may have input into such programming with regard to this issue.

If some of the request is not valid, it tries to deal with that within a certain amount of logic. If it makes a small mistake, for example performing the requested action on two lights when the user requested performing an action on three lights, system 10 may assumed the user will correct it. System may only try a certain amount of this type of searching for alternatives to the precise meaning of the user.

System 10 may keep track of any person from the time the person approaches the home until the time that person leaves the home including all the time that the person may be in the home. As a result, system 10 may announce a person approaching the home after it identifies such a person. This may occur even before the person steps into the home. System 10 may also be programmed to respond to a person named "Joe" approaching the home by saying "hi, Joe" or "hi, Joe is here" using the speaker 90. Alternatively, the system 10 may be programmed to unlock the front door when a particular person it detects approaches the home. System 10 may also keep track of where in the home the person is, including which room. System 10 may also keep track of which person is speaking. After system 10 handles entry of the new person into the home, system 10 may resume the conversation with the speaker where it left off.

System 10 may accomplish all the above monitoring in part through the use of a transducer 70. The transducer 70 may be set to be sensitive enough to receive a sound wave input derived from a pulse of a person. For example, transducer 70 may be set to up to approximately 450 kilohertz or may be set to a number within a range between approximately 50 kilohertz and approximately 450 kilohertz. This is sensitive enough to detect the pulse of a person depending on the distance that the person is away from the transducer. Each human being's pulse is understood to be unique, like a fingerprint. Accordingly, system 10 may be able to identify each person based on an automatic detection of the person's pulse without any action having to be taken by a home user.

To implement the identification process, system 10 may also include software 80 and hardware 85 capable of identifying a visitor to the home based on a signal from the transducer. Software 80 may be connected to and may control a speaker 90. Speaker 90 may receive an electromagnetic or other signal from software 80 and may convert the signal from software 80 to a sound signal identifying the visitor. The sound signal identifying the visitor may be incorporated into a larger message of speaker 90 controlled by software 80. For example, the message, may be simply announcing the identity of the visitor in natural language to the home user. For example, speaker 90 may state "Joe is coming to the front steps" or "Joe entered the living room". The content of the messages may be customizable to the user or may be a standard message deemed most appropriate for system 10 to include given the home's geographical location and other suitable factors such as language and custom. The present invention contemplates that the term "visitor" can include the user of the system 10 and the owner or user of the home in which the system 10 is operating.

Using transducer 70 and software 80, system 10 may keep track of a time that a conversation with the home user begins, a place where the home user is located during the conversation and an identity of the home user. Transducer 70 can keep track of an identity and location of more than 5 people in a room.

Transducer 70 may be set to receive pulses of the human heart up to between approximately 50 kilohertz to approximately 450 kilohertz, and in some embodiments the transducer 70 may operate between 50 and 250 kilohertz.

Although parser analyzer 20 may consider three hypotheses as to what the speaker means when the speaker utters a sentence, parser analyzer 20 may deviate from the three hypotheses approach. For example, parser analyzer 20 may have the capability to detect a strong imperative structure when it appears in the midst of non-imperative structures. This may allow parser analyzer 20 to short circuit an evaluation of several hypotheses as to a meaning of an input so that system 10 can then respond to the strong imperative structure. For example, while a speaker is conversing in natural language to system 10 about the weather, the speaker suddenly says "turn on the lights". This instruction may be preceded by the name of the system, for example "QUANSY". System 10 may recognize that the previous conversations about the weather are not relevant to that command to turn on the lights. Hence system 10 may react to that command out of context to the present conversation that was taking place. After implementing or responding to the command to turn on the lights, system 10 may resume talking to the speaker about the weather.

Parser analyzer 20 may stay in a sleep mode and refrain from analyzing what the home user says unless the home user prompts system 10. Parser analyzer 20 may pay attention to the home user only if the system 10 is called by recitation of a name of the system. For example, parser analyzer 20 may be dormant until the user says "QUANSY" (i.e. a nickname for system 10 standing for "question and answering system"), a name programmed by software 80 to be understood as prompting parser analyzer to move from a dormant mode to an active mode.

Even after being prompted to analyze what the home user says, system 10, at designated time intervals, may move to sleep mode wherein system 10 does not do anything or analyze what the home user says unless the home user indicates that there is an emergency. In that case, when the home user designates an emergency, system 10 may give priority to the home user's commands, questions and queries stated upon the designation of emergency status. Purely by way of illustration, the user may say "Emergency" to designate an emergency status for system 10.

System 10 may have energy saving advantages by virtue of its ability to process commands such as "when nobody is home for 5 minutes, turn off the lights and shut the heat". System 10 may understand "except" or "but" so the home user can say "after five minutes turn off all the lights except for the light in the living room". System 10 may achieve security advantages by virtue of the fact that system 10 centralizes the software to control the objects and circuits in the home in one place so that there may not need to be expensive software in each objects. Another security feature may be that each window in the house may include detectors that detect human contact and the detectors may be connected to system 10. Consequently, system 10 may "know" that there is no one known to be in the house since no pulse may be detected and may announce "there is no one supposed to be home but the outside windows in the den are being moved."

Figure 4:
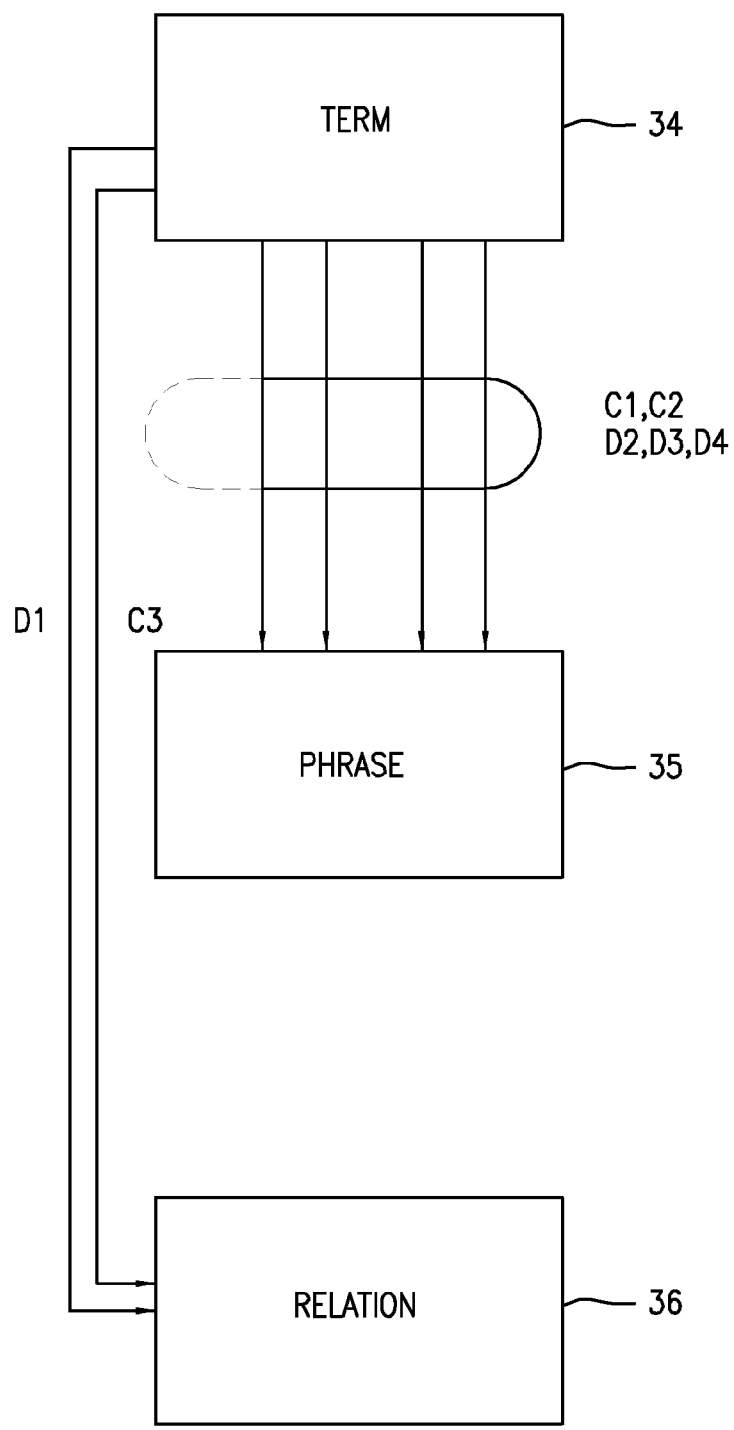
FIG. 4 is a schematic showing the operation of term structures in accordance with the system and method of the present invention.
Figure 5:
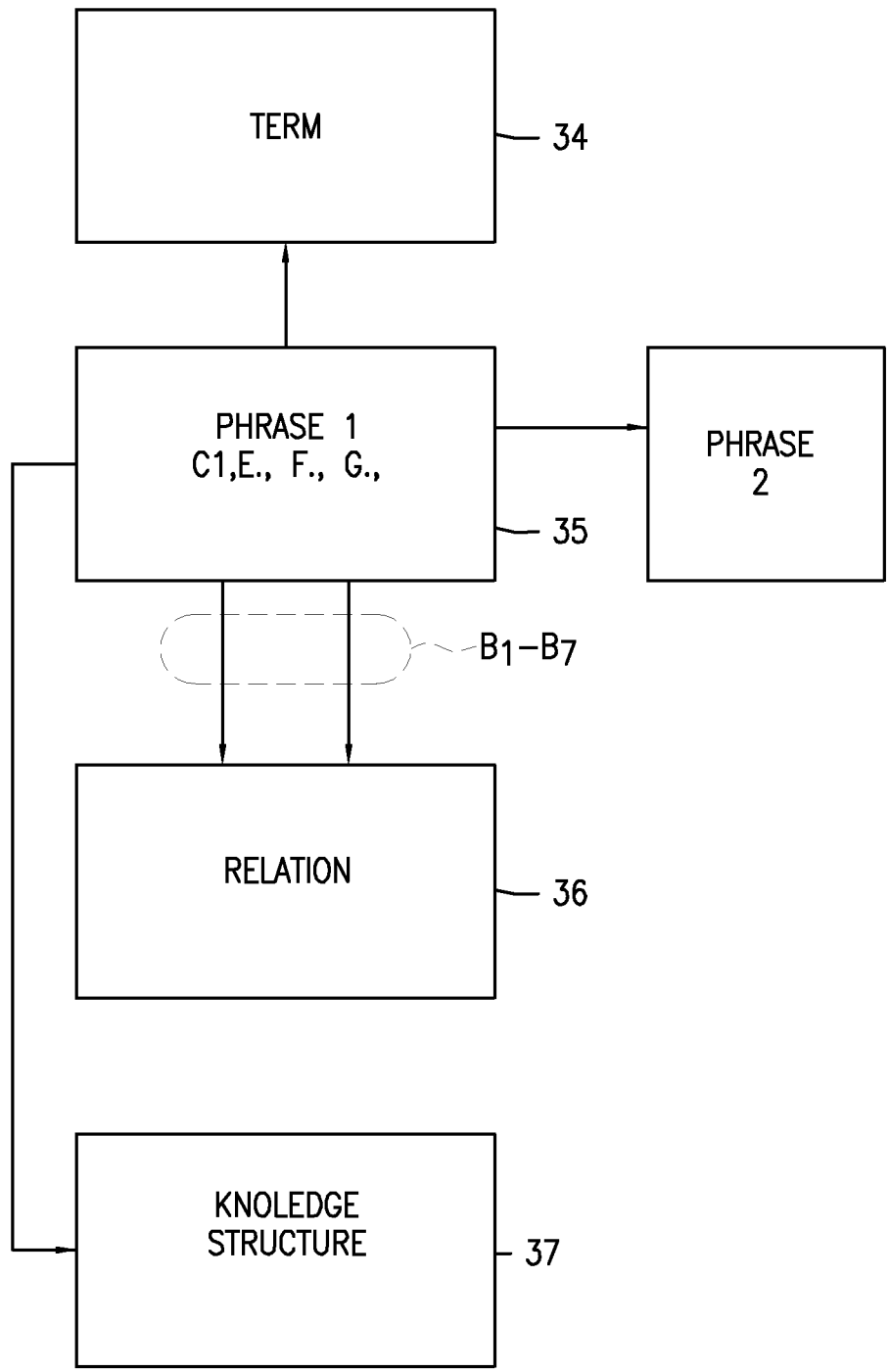
FIG. 5 is a schematic showing the operation of phrase structures in accordance with the system and method of the present invention.
Figure 6:
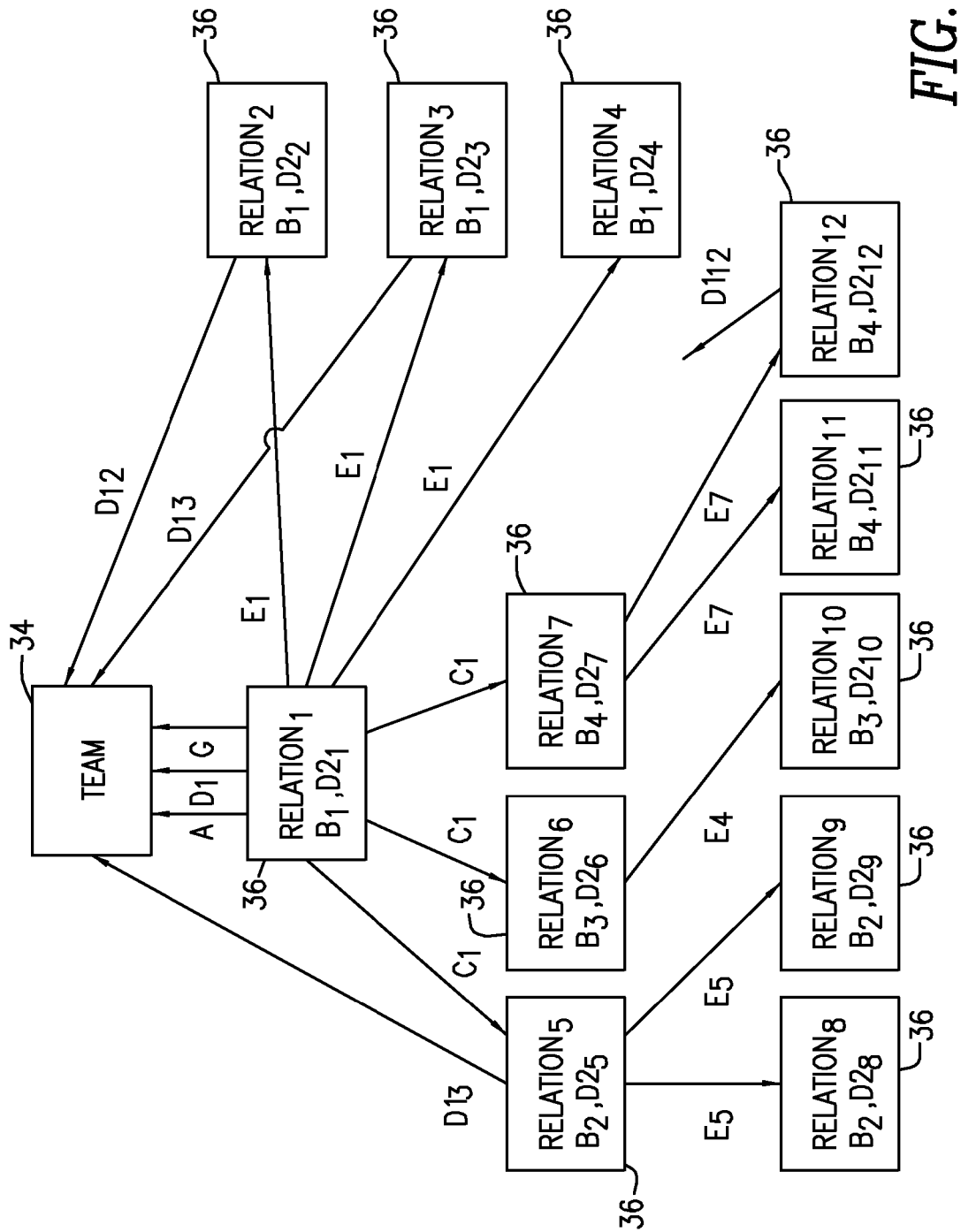
FIG. 6 is a schematic showing the operation of relation structures in accordance with the system and method of the present invention.
Figure 7:
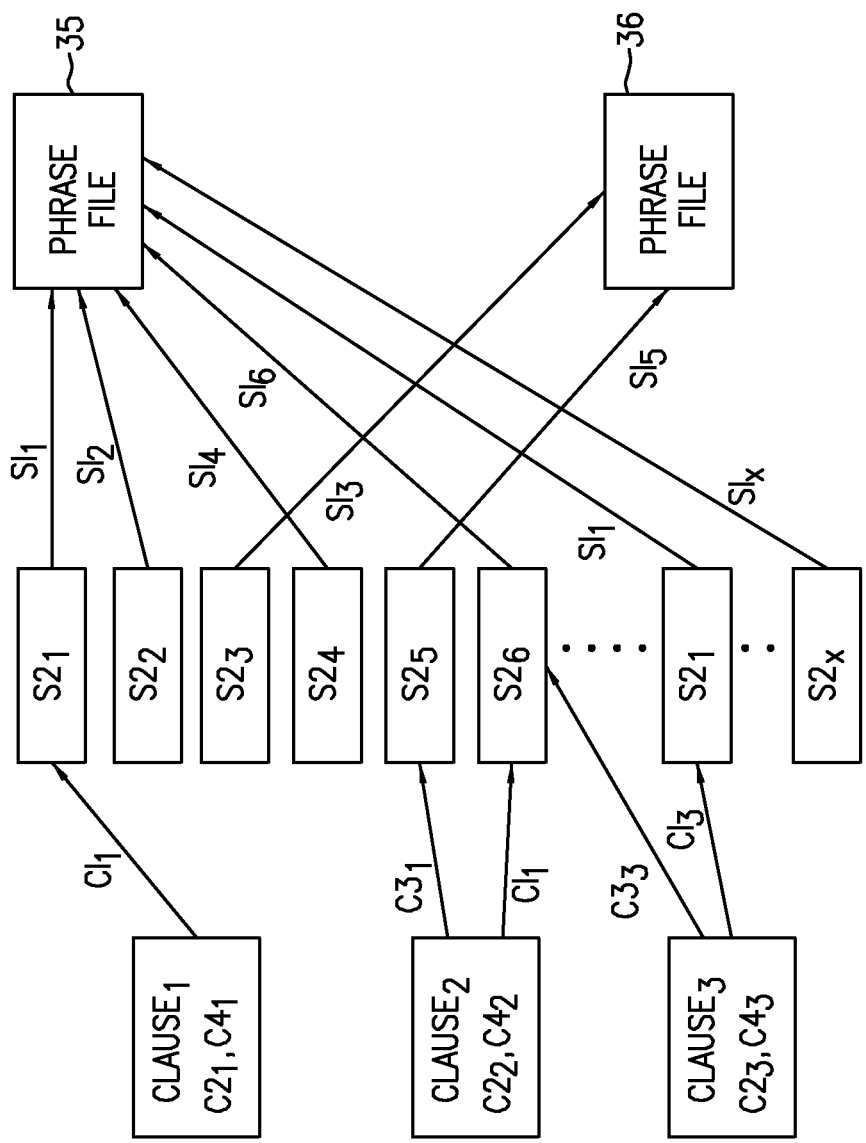
FIG. 7 is a schematic showing the operation of knowledge structures in accordance with the system and method of the present invention.

As seen from FIG. 4, memory structure 30 may include four distinct memory structures 33 which interrelate to form the total memory structure 30. These structures 33 are the term structures 34, the phrase structures 35, the relational or relation structures 36 and the knowledge structures 37. Term structures 34 contain all information regarding syntax as well as some semantic information. This information may be critical information that is used by parser analyzer 20.

Term structures 34 may provide knowledge concerning the basic elements of the natural language, for example the basic elements of English. The usual basic element of natural language is the word. It is necessary to distinguish the words and to provide information concerning what role the word plays. Every word may be analyzed by system 10. If the word is new, system 10 has no information concerning the nature of that word so the word is added to the dictionary in knowledge structures 37. The term structures 34 may contain information concerning the character representation, the term category, the term context (object of phrase, modifier in phrase, modifier of relation) and verb information for terms that can used as a verb (the location of the active generic form of the verb in the relation file, infinitive usage in a phrase and present and past participle usage in a phrase. Character representation is the graphic representation of the word used as an entry locator in the term file and for generating any message the system 10 might put out. The term categorization scheme may include categories such as preposition, pronoun, noun, adverbs, conjunction, verb, adjective, determiner, relative pronoun, question pronoun, cardinal number, fraction, ordinal number, command word. Each category may in turn have subcategories.

Any word in the term file may come under as many term categories as is necessary to fully describe its nature. For example, the word "like" may be a conjunction, a verb, a noun, a preposition and an adjective. The knowledge structures 33 may begin with a dictionary of approximately 500 to 600 terms in term structures 34. Each term in term structure 34 may be a word. In certain embodiments, term structure 34 may have a dictionary that starts with exactly 560 words. The dictionary may expand when a user/speaker speaks during use of system 10 and uses a new word not previously in the dictionary.

The phrase structures 35 handles meaningful groupings of words The basic meaningful groupings may be called phrases. The phrase structure file may contain, in certain embodiments, only one entry for each distinct noun phrase isolated by system 10. For example, regarding the noun phrase "the house", the phrases "by the house", "in the house", "cleaning the house", "to build the house" may have the same entry even though one may be a prepositional phrase and one may be a noun phrase.

The phrase structures 35 may contain entries consisting of (a) the words in the phrase in sequence, (b) where and how the phrase is used including subject, object, indirect object, where, when, how and what, (c) where permanent location information (i.e. New York is one hundred ten miles north of Philadelphia as opposed to Joe is ten feet in front of Robert) concerning a particular phrase is located, (d) which knowledge structures the phrase appears in, (e) numeric values of the phrase (i.e. "the 5 cats" the word "5" is understood and saved as a value rather than merely a word), (f) quantification code and (g) phrase type code (1 is singular, 2 is plural, 3 is a group (i.e. water), 4 is numeric (i.e. 5 cats), 5 is quantified ("every cat"), 6 is quantified and numeric ("every 5 cats"), 11 is quantified and singular ("every cat"), 12 is quantified and plural ("all the cats") and 13 is quantified and group ("all the water") and 22 is quantified, plural and numeric ("every five men").

At the beginning of the use of system 10, the phrase structures 35 may be completely empty and are filled as analysis by the parser analyzer occurs. The same may be true of the relation structures 36.

Relational structures 36 specify information regarding verb phrases, such as "is eating". The relation structures may contain entries including such information as (a) identification of relation via the verb in its infinitive form, (b) verb transformations, (c) locations in the relation file of same verb with different transformations, (d) verb qualifications, (e) locations in the relation file of same verb with same transformation, different qualifications, (f) knowledge structures 37 in which this relation occurs and (g) irregular formations.

Knowledge structures 37 may include pragmatic information concerning the home that creates a framework within which the parser-analyzer analyzes the incoming speech of the home user. Purely by way of illustration, such information in knowledge structures 37 may include for each room in the house particular information concerning how many objects or appliances are located in the room, which type of object or appliance they are (i.e. lights), what general customs or rules are observed concerning when the objects or appliances are in an "ON" state and when they are in an "OFF" state. For example, during the work week the rules might be one thing since certain rooms in the home may be used as an office whereas during the weekends the rules may be something quite different. Knowledge structures may also include specific directives. For example, there may be a safety directive that if system 10 detects through transducer 70 that the pulse of a person the home exceeds an upper bound or falls to a lower bound, the system 10 should tell the user of this fact or take some other appropriate action. In another example, if the home user states that it is "dark in here", the system 10 may signal the circuits controlling the lights in the room that the user is in and place the lights in an "ON" position, that is turn on the lights in that room. This directive may be something that the user teaches system 10 or else this directive may be preprogrammed into the knowledge structures 37.

Each room in the typical house or apartment, may be assigned a knowledge structure 37a for rooms. This knowledge structure 37a may differ from the standard knowledge structures 37 in that it has a definitional area with the following specifications:

1. Name of the room
   a. Kitchen
   b. Salon
   c. Master bedroom
   d. Boy's room
   e. Etc.
2. Room definitions
   a. Lights
      i. Lamps
      ii. Ceiling
   b. Electric outlets
   c. Appliances
      i. Communication protocol
      ii. Options definitions
   d. Cameras
      i. Name
      ii. Definition
3. Additional specific definitions This is the information used for example, when the command that is given is "Turn on the salon lights." When system 10 is originally turned on, system 10 may attempt to acquire as much of this information as possible. The rest of the information may be acquired during the actual operation of the system.

Figure 8:
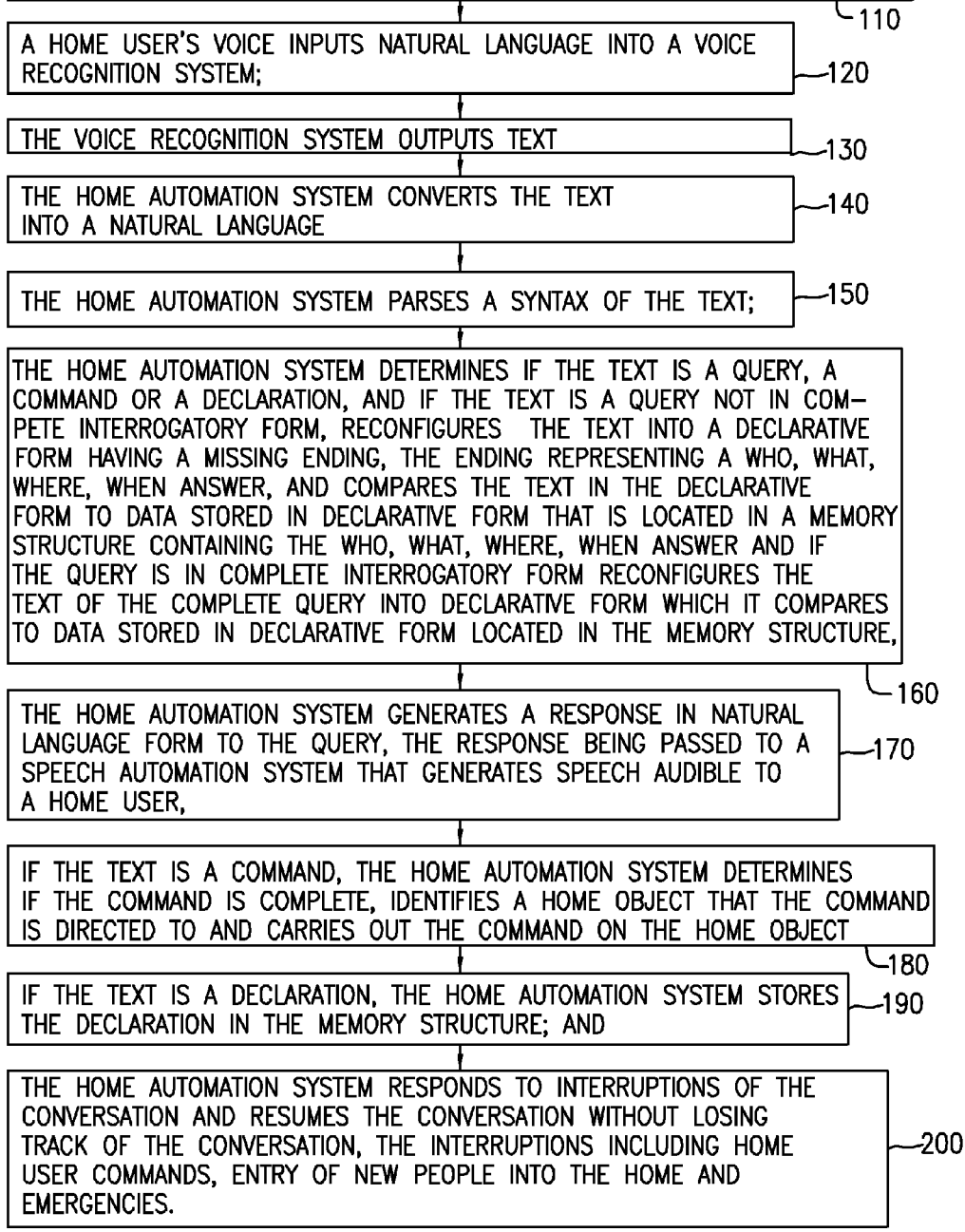
FIG. 8 is a flow chart showing a method of the present invention.

As seen from FIG. 8, knowledge structures 37 may be made up of two files, the clause file 62 and the structure file 64. As seen from FIG. 8, each entry in the structure file 64 may have two items. Item one in the structure file, "S1", may be a phrase or relation pointer specifying the location of a phrase or relation in the respective files. Item 2 in the structure file, "S2", may indicate whether item 1, "S1", is pointing to a phrase or to a relation. The values that item 2 S2 of the structure file can have are:

| Value | File | Interpretation |
|---|---|---|
| 1 | Phrase | Subject |
| 2 | Phrase | Object |
| 3 | Phrase | Indirect Object |
| 11 | Phrase | Where |
| 12 | Phrase | When |
| 13 | Phrase | How |
| 14 | Phrase | Why |
| 15 | Phrase | What |
| 51 | Phrase | Locational on Subject |
| 52 | Phrase | Locational on Object |
| 60 | Phrase | Locational on immediately preceding phrase |
| 61 | Relation | Gerund |
| 62 | Relation | Infinitive |
| 63 | Relation | Verb Phrases |

As seen from FIG. 8, each entry in clause file 62 may have four items. Item one in the clause file, "C1", may point to the first entry for the clause in the structure file. The last entry in the structure file for a particular clause may be indicated by either the next entry in the clause file. Item 2 in the clause file, "C2", may indicate what role the particular clause has in the knowledge structure, for example an independent clause, a modifying clause, an embedded clause, etc. Item 3 in the clause file, "C3", may indicate which phrases or clauses are modified by this clause, or are conjunctive with this clause. The phrases or clauses referred to in item 3 are identified y their location in the structure file. Item 4 in the clause file, "C4", may indicate the type of conjunction and has the same values as specified for the conjunction subcategory.

As an example, the knowledge structure 37 for the following sentence appears below: "The boys are eating fillet of sole in Atlantic City while the girls, who were brought by the boys, and the sailors are swimming and playing in Margate"

| Clause File | | Structure File | | |
|---|---|---|---|---|
| 1. $X_1X_2X_3X_4$ | 1. $P_1$ | S | | The boys |
| 2. $y_1y_2y_3y_4$ | 2. $R_1$ | VP | | are eating |
| 3. $z_1z_2z_3z_4$ | 3. $P_2$ | O | | fillet of sole |
| | 4. $P_3$ | Where | | Atlantic City |
| If $X_1 = X_2 X_2 =$ Independent | 5. $P_4$ | S | | The girls |
| $y_1 = y_2 =$ embedded | 6. $R_2$ | 6VP | | were brought |
| $z_1 = 8 \; z_2 =$ modifying | 7. $P_1$ | O | | The boys |
| | 8. $P_4$ | S | | The girls |
| $X_3 = 0 \; x_4 = 0$ | 9. $P_5$ | S | | The sailors |
| $y_3 = 8 \; y_4 = 4$ | 10. $R_3$ | VP | | are swimming |
| $z_3 = 4 \; z_4 = 5$ | 11. $R_4$ | VP | | are playing |
| | 12. $P_6$ | Where | | Margate |

System 10 may also be capable of utilizing information from the Internet in answer questions posed by a speaker. Hardware 85 and software 80 may permit system 10 to connect the memory structure 30 to a global telecommunications system and to download data from the Internet. For example, the speaker in the home, which may be the user, may utter the sentence "what's the weather in Cincinnati". If system 10 has never previously been asked about the weather, system 10 may ask "what do you mean?" The speaker may then answer "what is the temperature?" or "is it cloudy or not". System 10 may also retain this information so that the next time that the same query is made, it may "know" what the user's intent may be.

System 10 may provide a response immediately since the home is located in Cincinnati. In addition, if temperature is what is requested and the outdoor thermometer is one of the systems in the home that it is connected to, system 10 can access the information. Suppose the speaker goes on to ask "how about Chicago?". The system 10 may then research the answer at www.weather.com by accessing one of the objects system 10 is connected to, i.e. a computer, or system 10 may first ask "on which date" and when the speaker provides a date the system 10 may then research the answer at www.weather.com.

Conversations in natural language tend to veer into unexpected areas, and the particular areas may vary depending upon interests of the speakers (in this case the home user or others in the home). This tendency to veer into unexpected areas may generate an infinite amount of knowledge about those areas. Accordingly, system 10 may provide that each of the memory structures 33, 34, 35, 36 may have extensible memories.

Each of the structures 34, 35, 36, 37 may have lists containing a collection of defined characteristics of the term or phrase or relation or knowledge, as the case may be. For example, the term "cat" may have a list including a characteristic (1,x) defining where the codes in the memory 33 begin, another characteristic (2,x) defining the number of codes, and a third characteristic (3,x) defining something else. Each of these lists may have an extensible memory (that is, the system 10 allows for unlimited sized lists). This may be accomplished by setting up memory into chunks of five items, the first four of which are regular memory chunks and the fifth being a continuation pointer that identifies where in the memory to look for the continuation of the information—the next set of memory chunks. Thus, the lists may avoid being set up as fixed columns.

In general, the lists may be kept in sorted order to assist in the search process. Originally, the list pointer is zero indicating that at this point there is no list. Subsequently, and in the case of the codes for the TERM immediately, information will be entered. If the list pointer is zero, then the first set of the list information may be selected by taking 5 memory chunks from the memory controller. These memory chunks may be uniquely identified by the pointer of the first chunk, with the second chunk being pointer+1, the third one being pointer+2 etc. The last chunk, pointer+4 will originally have the value zero to indicate the end of the list. When the list extends to beyond 4 elements, an additional set of the list information may be selected by taking an additional 5 memory chunks from the memory controller. The pointer to this new set of information may be entered into the last location of the original set (into pointer+4). Once again, all of these "new" elements may be identified via the value of their pointer, with the values pointer through pointer+4. As long as there are no more than 8 members to the list, the value of location pointer+4 will be zero, indicating the end of the list. Once the ninth element has to be entered, the same process may be performed again As seen from FIG. 8, which is a flow chart, the present invention can also be expressed as a method 100 of intelligent home automation for home systems that control objects. Method 100 may include the step 110 of a home automation system carrying on a conversation in a natural language with a home user concerning anyone present in the home and concerning any objects in the home that need to be controlled by the home user. In step 110 the home automation system may include software and may include hardware connected to the objects or to home systems controlling the objects. The home automation system may carry on the conversation when several substeps occur. These substeps may include substep 120 whereby a home user's voice may input natural language into a voice recognition system. A further substep 130 may involve the voice recognition system outputting text in a form of a series of sound segments. An additional substep 140 may involve the home automation system converting the sound segments into a natural language. A still further substep 150 may involve the home automation system parsing a syntax of the text to determine if the text is a query, a command or a declaration.

In another substep 160, the home automation system may determine if the text is a query, a command or a declaration, and if the text is a query, the system may reconfigure the text into a declarative form. In a further substep 162, if the query is considered "not in complete interrogatory form", then the system may reconfigure the text into a declarative form that may have a missing ending, the ending representing a who, what, where when answer and the system may then compare the text in the declarative form to data stored in declarative form that is located in a memory structure containing the who, what, where, when answer. In a further substep 164, if the query is considered in complete interrogatory form (i.e. "Is the cat green?" or another yes or no question), then the system may reconfigure the text into a declarative form that may be a complete declaration followed by a question mark and the system may then compare the text in the declarative form to data stored in declarative form that is located in a memory structure that may represent the answer. A substep 170 may involve the home automation system generating a response in natural language form to the query. In another substep 172, the system may pass the generated response to a speech generation system that may generate speech comprising the response audible to a home user. In a further substep 180, if the text is a command, the home automation system may determine if the command is complete, may identify a home object that the command is directed to and may carry out the command on the home object. In a substep 190, if the text is a declaration, the home automation system may store the declaration in the memory structure. Further, in a substep 200 the home automation system may respond to interruptions of the conversation and may resume the conversation without losing track of the conversation, the interruptions including home user commands, entry of new people into the home and emergencies.

The memory structure, which contains structures relating to term, phrase, relation and knowledge, may be extensible and may supply the parser-analyzer with information concerning the input to be analyzed, and then store the output of the parser-analyzer, which is the information after it has been formally structured.

A Computer Program Listing Appendix incorporated in its entirety herein lists the basic theoretical definition of memory structures 30 used by system 10 in the form of coded documentation.

It should be understood, of course, that the foregoing relates to exemplary embodiments of the invention and that modifications may be made without departing from the spirit and scope of the invention as set forth in the following claims.

I claim:

1. A method of intelligent home automation that controls objects in the home, the method comprising:
   a home automation system carrying on a conversation in a natural language with a home user concerning anyone present in the home and/or concerning any objects in the home that need to be controlled by the home user, the home automation system including software and including hardware either connected to the objects or to home systems controlling the objects,
   the home automation system carrying on the conversation such that:
   (i) a home user's voice inputs natural language into a voice recognition system;
   (ii) the voice recognition system outputs text;

(iii) the home automation system converts the text into a natural language;
(iv) the home automation system parses a syntax of the text;
(v) the home automation system determines if the text is a query, a command or a declaration, and if the text is a query not in complete interrogatory form, reconfigures the text into a declarative form having a missing ending, the ending representing a who, what, where when answer, and compares the text in the declarative form to data stored in declarative form that is located in a memory structure containing the who, what, where, when answer and if the query is in complete interrogatory form reconfigures the text into a declaration form followed by a question mark and then compares the text of the complete query in declarative form to data stored in declarative form located in the memory structure,
(vi) the home automation system generates a response in natural language form to the query, the response being passed to a speech automation system that generates speech audible to a home user,
(vii) if the text is a command, the home automation system determines if the command is complete, identifies a home object that the command is directed to and carries out the command on the home object,
(viii) if the text is a declaration, the home automation system stores the declaration in the memory structure; and
(vii) the home automation system responds to interruptions of the conversation and resumes the conversation without losing track of the conversation, the interruptions including home user commands, entry of new people into the home and emergencies.

2. The method of claim 1, further comprising prioritizing a processing of responses to queries and commands.

3. The method of claim 2, wherein the prioritizing is based on an initial content within a query or command.

4. The method of claim 1, further comprising processing and responding to an interrupting query or command prior to processing pending queries and commands.

5. The method of claim 1, wherein the parser can detect a strong demand structure.

6. A system of intelligent home automation, comprising:
a parser analyzer;
memory structures;
a question answering routine capable of generating natural language responses to natural language queries, storing declarative information from declarations of a user into the memory structures and responding to commands to control objects by searching for the objects in the memory structures and switching home circuits on or off connected to the objects;
a transducer set to receive a sound wave input derived from a pulse of a person, the person located in the home or near the home;
software capable of identifying the person based on a signal from the transducer;
a speaker for announcing an identity of the visitor in natural language to a home user; and
hardware connecting the software to objects and/or systems in the home that are operable automatically.

7. The system of claim 6, wherein the parser analyzer can detect a strong imperative structure when it appears in the midst of non-imperative structures, can short circuit an evaluation of several hypotheses as to a meaning of an input and can respond to the strong imperative structure.

8. The system of claim 6, further comprising hardware and software for connecting the memory structure to a global telecommunications system and for downloading data therefrom.

9. The system of claim 6, wherein the memory structures include memory structures concerning term, phrase, relation and knowledge.

10. The system of claim 9, wherein the memory structures each have extensible memories.

11. The system of claim 6, wherein using the transducer and the software the system keeps track of a time that a conversation with the home user begins, a place where the home user is located during the conversation and an identity of the home user.

12. The system of claim 6, wherein the transducer can keep track of an identity and location of more than 5 people in a room.

13. The system of claim 6, wherein the transducer is set to receive voice pulses up to between approximately 50 kilohertz to approximately 450 kilohertz.

14. A system of intelligent home automation, comprising:
a parser analyzer that considers three hypotheses as to what a speaker means but can short circuit consideration of the hypotheses if it detects a strong imperative structure;
memory structures including structures concerning term, phrase, relation and including knowledge structures,
a question answering routine capable of accessing memory structures to store declarations, responding to commands by controlling home circuits and generating natural language responses to natural language queries by converting queries into declarations in conjunction with the parser analyzer and searching the knowledge structures for similar declarations that end with an answer or represent an answer, the question answering routine also capable of accessing data from global telecommunications system to respond to queries from a home user and storing such data in the knowledge structures for use in natural language responses;
software capable of identification of a visitor to the home based on a signal from the visitor;
a speaker for announcing the identity of the visitors in natural language to a home user, and
hardware connected to home circuits that control objects.

15. The system of claim 14, wherein the knowledge structures begin with a dictionary of approximately 500 to 600 terms and wherein the dictionary expands when a speaker uses a word not previously in the dictionary of the system.

16. The system of claim 14, wherein the parser analyzer does not analyze what the home user says unless the home user prompts the system.

17. The system of claim 16, wherein the parser analyzer pays attention to the home user only if the system is called by recitation of a name of the system.

18. The system of claim 14, wherein even after being prompted to analyze what the home user says, the system, at designated time intervals, moves to sleep mode wherein the system does not do anything or analyze what the home user says unless the home user designates an emergency.

19. The system of claim 14, wherein when the home user designates an emergency the system gives priority to the home user's commands, questions and queries stated after the designation of emergency status.

20. The system of claim 14, further including the question answering routine generating natural language responses to natural language queries by converting queries not in complete interrogatory form into declarations that end in blanks.

21. The system of claim 20, further comprising the question answering routine also generating natural language responses to natural language queries by converting yes or no queries into complete declarations.

* * * * *